United States Patent [19]

Klomp

[11] 4,428,334
[45] Jan. 31, 1984

[54] ENGINE WITH VARIABLE FLOW CONTROLLED CELLULAR INTAKE PORT

[75] Inventor: Edward D. Klomp, Mount Clemens, Mich.

[73] Assignee: General Motors Corporation, Detroit, Mich.

[21] Appl. No.: 323,188

[22] Filed: Nov. 20, 1981

[51] Int. Cl.³ .................................... F02M 35/10
[52] U.S. Cl. ............................ 123/188 M; 123/306
[58] Field of Search ............... 123/52 M, 188 M, 306, 123/590

[56] References Cited

U.S. PATENT DOCUMENTS

| | | | |
|---|---|---|---|
| 1,103,931 | 7/1914 | Bennett | 123/590 |
| 1,641,527 | 9/1927 | Brewer | 123/52 M |
| 2,921,571 | 1/1960 | Vogel et al. | 123/188 M |
| 3,955,362 | 5/1976 | Jones et al. | 60/274 |
| 4,320,725 | 3/1982 | Rychlik | 123/188 M |

FOREIGN PATENT DOCUMENTS

| | | | |
|---|---|---|---|
| 1282159 | 12/1961 | France | 123/188 M |
| 55-40277 | 3/1980 | Japan | 123/188 M |
| 2031999 | 4/1980 | United Kingdom | 123/52 M |

Primary Examiner—Craig R. Feinberg
Assistant Examiner—W. R. Wolfe
Attorney, Agent, or Firm—Robert J. Outland

[57] ABSTRACT

An internal combustion engine is provided with intake ports having transversely intersecting, longitudinally extending, wall defining cellular passages for intake flow. Selective control of both the location and volume of flow are provided by various means such as slidable entrance valves or an adjustable connecting manifold. In the latter case, movement of the manifold may variably control the flow of either air-fuel mixture or air through the various cellular passages in the respective intake ports.

4 Claims, 9 Drawing Figures

ENGINE WITH VARIABLE FLOW CONTROLLED CELLULAR INTAKE PORT

TECHNICAL FIELD

This invention relates to internal combustion engines, and in particular to intake ports for such engines wherein multiple walls define cellular passages, flow through which may be controlled by valve means at the inlet of the intake port to desirably influence the amount and/or location and direction of inlet fluid delivery to the associated engine cylinder.

BACKGROUND

Many forms of intake port designs have been proposed for internal combustion engines to obtain various desired results, such as relatively unrestricted flow into the cylinders, the control of charge direction or stratification in the cylinders, charge volume variation and the like.

SUMMARY OF THE INVENTION

The present invention provides an arrangement for the intake ports and associated portions of an engine capable of favorably affecting fluid delivery into the engine cylinders by breaking up the port flow area into a plurality of small cellular passages and providing means for desirably controlling the flow of air-fuel mixture and/or air through the various passages within the intake port. The passages need not be all of one size but may, if desired, be deflected or twisted to impart a swirl component to the flow entering the combustion chamber.

In addition, valve means such as a slidable plate may be employed at the port entrance to control the number and location of open passages within the port. Adjustment of the control valve to selectively close various passages can be utilized to vary the amount of in-cylinder swirl by controlling the area and selected portion of the port outlet through which the inlet charge is discharged into the cylinder. In addition, selective closing of passages will reduce the cross-sectional flow area of the port and result in higher velocity flow through the open passages with a resultant increase in swirl or turbulence in the cylinder.

In another variation of the concept, the ports can be fed from an air plenum having mounted therein a slidable manifold which directs air-fuel mixture to the various ports. Sliding of the manifold to vary the registry of its leg ends with the associated intake ports will vary the division of flow into the port passages between air-fuel mixture delivered from the manifold and air received directly from the plenum chamber.

These and other arrangements of ports for control of air and fuel flow may be contemplated within the scope of the present invention, further features and advantages of which will be understood from the following description of certain preferred embodiments taken together with the accompanying drawing.

BRIEF DRAWING DESCRIPTION

DETAILED DESCRIPTION

Figure 1:
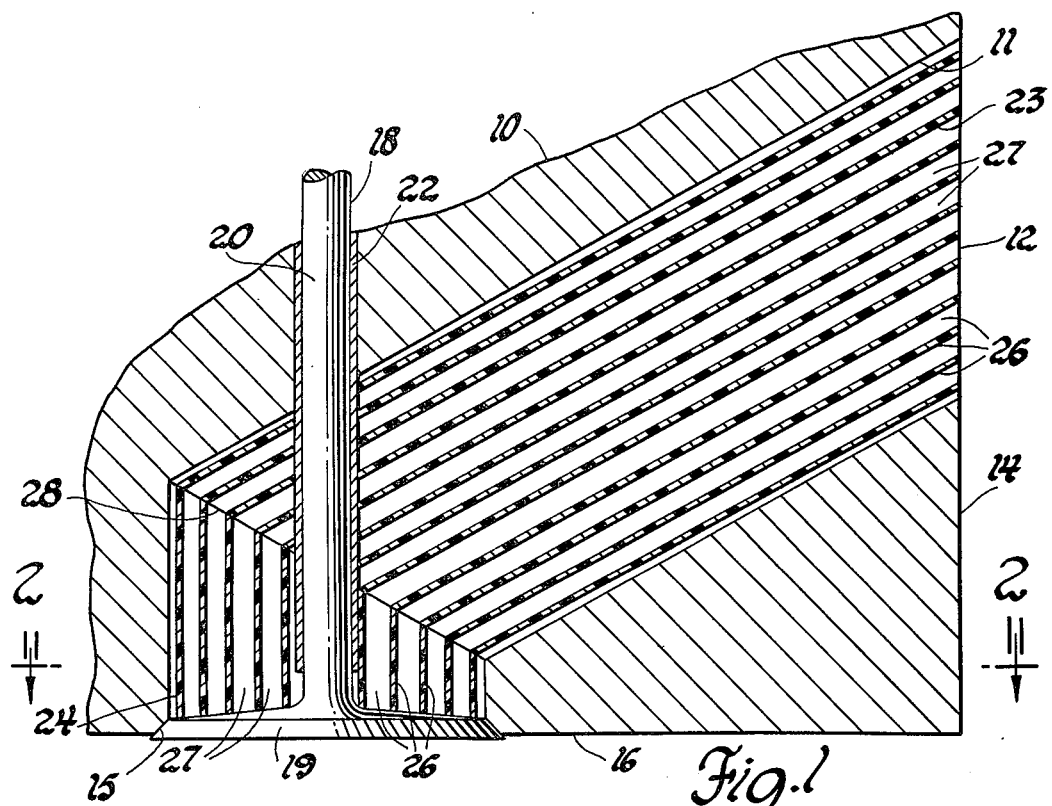
FIG. 1 is a fragmentary cross-sectional view of an engine cylinder head showing an intake port portion formed in accordance with the invention.
Figure 2:
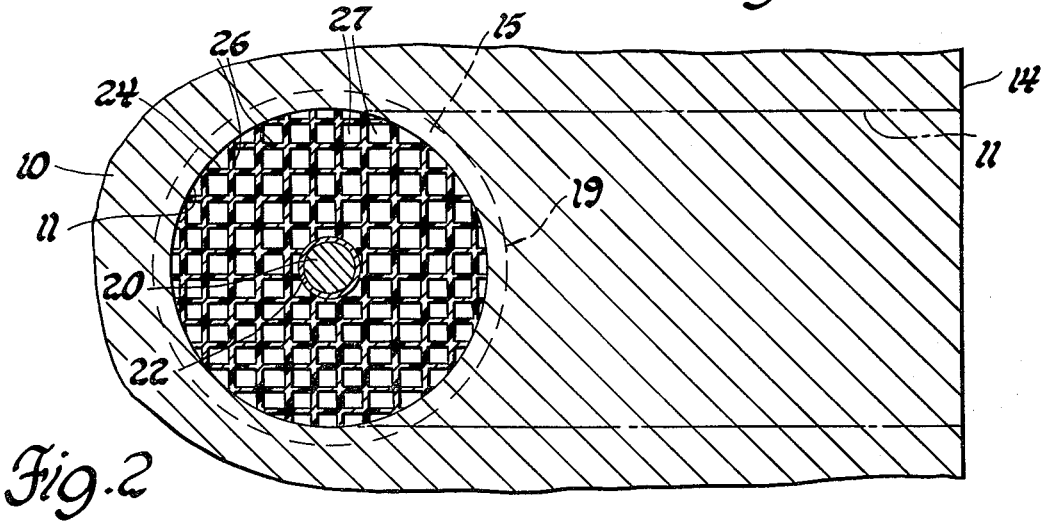
FIG. 2 is a cross-sectional view from the plane indicated by the line 2—2 of FIG. 1.

FIGS. 1 and 2 of the drawings illustrate a cylinder head 10 for an internal combustion engine having a plurality of intake ports 11 formed in accordance with the principles of the invention but only one of which is shown. Each intake port 11 extends from an entrance portion 12 opening through a side wall 14 of the cylinder head, to a valve seat 15 recessed into the bottom wall 16 of the cylinder head and defining the periphery of the lower end of the port. A poppet intake valve 18 includes a head 19 which is seatable on the valve seat to close the lower end of the port. A stem 20 extends from the top of the valve head and is carried in a valve guide 22 received in the cylinder head. The guide 22 extends downwardly into the port interior around the valve stem and acts as a bearing for reciprocating motion of the valve into seated and unseated positions wherein the intake port is respectively closed and opened for communication with an associated engine cylinder not shown.

Within the port 11, the flow area is divided into a plurality of cellular passages by a pair of port inserts 23, 24 each having a large number of transversely intersecting walls 26 extending longitudinally of their respective inserts and forming a plurality of adjoining but separated cellular passages 27 extending the length of each insert. Insert 23 extends from the port entrance portion to a line 28 defining the sharply angled intersection of two connecting linear portions of the port 12. Insert 24 extends from this line 28 downwardly to adjacent the upper face of the valve head in its seated position. The inserts may be formed of any suitable material such as metal or ceramic to define individual elements which may be slipped into preformed straight portions of their respective inlet ports from the open ends of said portions and fixed in place within the ports by any suitable means.

Together the inserts define cellular passages 27 which extend from the port entrance portion 12 at the side wall 14 of the cylinder head to the valve head 19 seated on the valve seat 15. While the drawing shows the cellular passages from the two inserts aligned in direct registry, this is not a requirement of the invention. Nevertheless such an arrangement appears desirable to minimize any restriction to air flow at the intersection of the individual inserts.

Figure 3:
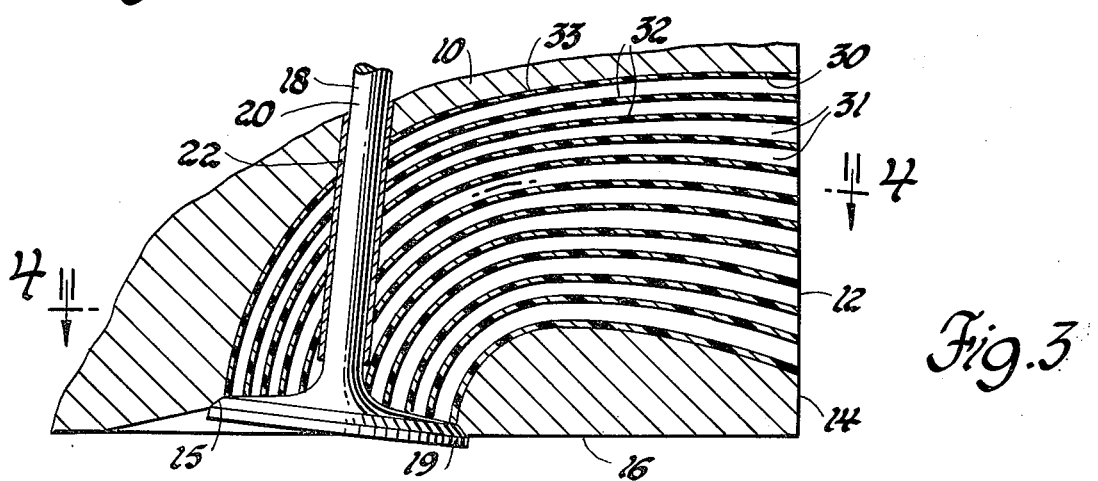
FIG. 3 is a fragmentary cross-sectional view similar to FIG. 1 but showing a modified form of intake port in accordance with the invention.
Figure 4:
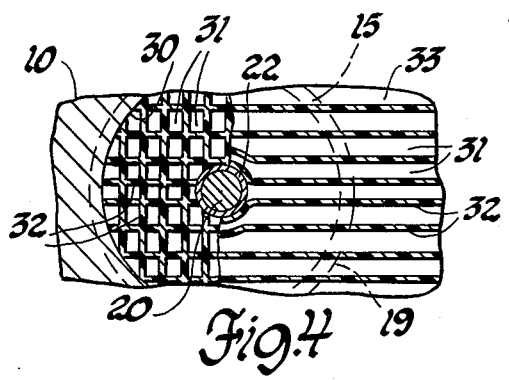
FIG. 4 is a fragmentary cross-sectional view from the plane indicated by the line 4—4 of FIG. 3.

The embodiment of FIGS. 3 and 4 is similar in certain respects to that of FIGS. 1 and 2 so that like numerals will be utilized for like parts. In the FIGS. 3 and 4 embodiment, an intake port 30 extends in curving fashion between the entrance portion 12 of the side wall 14 to the valve seat 15 in the bottom wall 16 of the cylinder head 10. Cellular passages 31 are formed by transversely intersecting walls 32 made of a pliable plastic or elastic material to form a unitary insert 33. At assembly, the insert which may be forced into the open entrance portion of the port and deformed to extend the length of the port configuration, as well as to receive the valve guide and valve stem. Alternatively, the insert 33 may be cast in place within the port with the walls 32 being formed of more rigid material.

In every instance, the construction of the cellular passage defining walls 26 or 32 should be such as to minimize the wall thickness so as to avoid excessively restricting the port area available for fluid flow. While some such restriction cannot be avoided, it is anticipated that the flow separation reducing effect of dividing the port into many small cellular passages will have a beneficial effect on fluid flow, which will balance to some extent the restrictive effect of the reduction in flow area caused by the presence of the walls.

Figure 5:
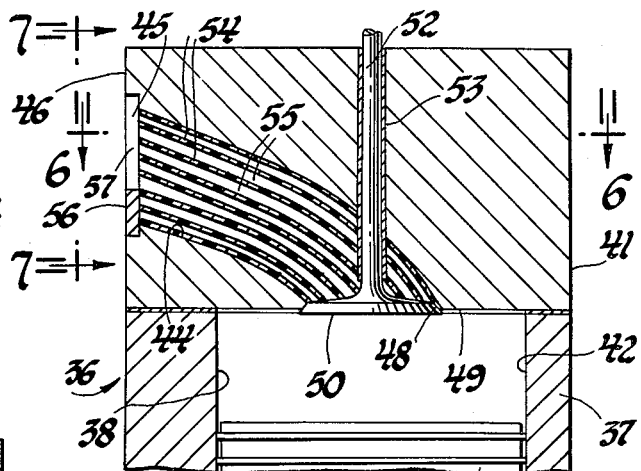
FIG. 5 is a partial cross-sectional view of an engine containing valve controlled intake port means in accordance with the invention.
Figure 6:
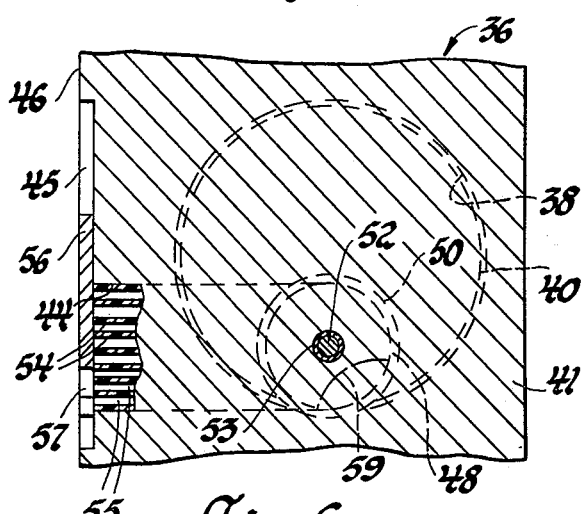
FIG. 6 is a cross-sectional view from the plane indicated by the line 6—6 of FIG. 5.
Figure 7:
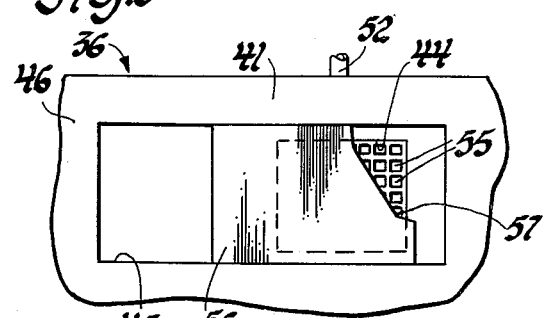
FIG. 7 is a side view showing the port control valve arrangement from the plane indicated by the line 7—7 of FIG. 5.

FIGS. 5 through 7 disclose an arrangement in accordance with the invention utilizing the cellular intake port concept in an engine generally indicated by the numeral 36. The engine includes a cylinder block 37 defining a plurality of cylinders 38, one of which is shown and each of which reciprocably receives a piston 40. A cylinder head 41 closes the ends of the cylinders so as to define at the closed ends thereof variable volume combustion chambers 42.

Within the cylinder head there is formed a cellular intake port 44 for each cylinder. The ports may be of any suitable physical embodiment such as, for example, either of those previously described. Each port 44 extends through the cylinder head from a recess 45 formed in the side wall 46 to a valve seat 48 formed in the bottom wall 49. A valve 50 is seatable on each valve seat 48 and is supported by a stem 52 carried in a valve guide 53 extending through the cylinder head and into the port 44. A plurality of transversely intersecting walls 54 define cellular passages 55 extending in generally parallel relationship for the length of the port.

Within the recess 45 that is provided in the side wall 46 of the cylinder head, there is mounted a slide valve 56 which is movable laterally across the port entrance to selectively close or open the various cellular passages of the intake port. A corner portion of the valve is cut away at 57 so as to provide for the preferential initial opening of a corresponding selected portion of the port cellular passages. The construction directs inlet flow through the selected open passages to a predetermined outlet area as shown at 59.

In operation, the slide valve may be used as a throttle mechanism or a separate throttle may be utilized upstream of the intake ports in conventional fashion. In either case, movement of the slide valve 56 for each port will selectively control the opening of the various cellular passages in the port so as to control the outlet direction from and volume of flow through the port as desired. In this manner, swirl or other directed flow within the combustion chamber may be increased or decreased by varying the number and location of the open cellular passages. In addition, the rate of flow through the passages may be desirably controlled by movement of the slide valve.

Figure 8:
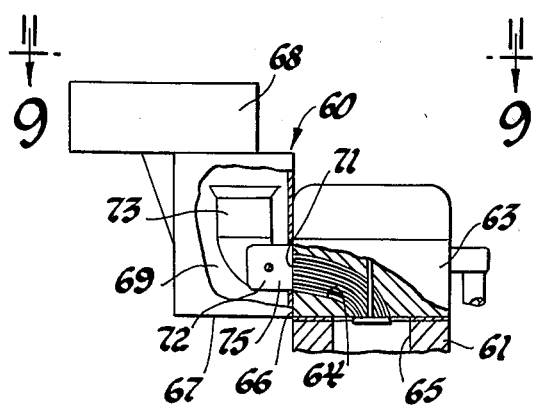
FIG. 8 is a partial cross-sectional view of an engine having an adjustable manifold control arrangement in accordance with the invention.
Figure 9:
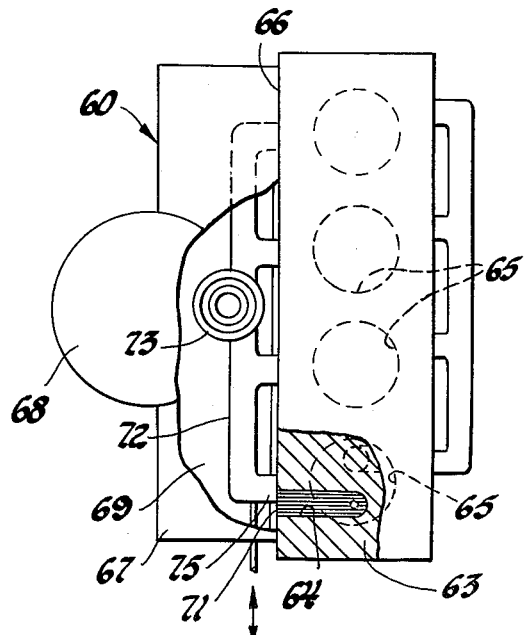
FIG. 9 is the top view partially broken away as seen from the plane indicated by the line 9—9 of FIG. 8.

FIGS. 8 and 9 disclose another arrangement in accordance with the invention for utilizing the cellular intake port concept in an engine generally indicated by numeral 60. Engine 60 includes the usual cylinder block 61 and cylinder head 63 containing a cellular intake port 64 leading to each of the cylinders 65 in the cylinder block.

On a side wall 66 of the cylinder head 63 there is mounted an air chamber 67 supporting a filter 68 through which intake air is received for delivery to a plenum 69 within the air chamber 67. Within the plenum 69, entrance portions 71 of the respective intake ports open through the side wall 66, on which there is also mounted a mixture intake manifold 72 supporting a carburetor 73 or other suitable device for supplying to the manifold a combustible air-fuel mixture. The manifold and carburetor are mounted within the plenum 69 so as to receive air therefrom and mix it with fuel delivered, through means not shown, directly to the carburetor 73.

The manifold includes a plurality of outlet runners 75 which extend into engagement with the cylinder head side wall 66 to carry the air-fuel mixture to the respective port entrance portions. However, the manifold is mounted so as to be longitudinally movable along the surface of the side wall 66 so that the runners 75 may be slid into greater or lesser registry with their corresponding cylinder head intake ports. The walls of the manifold are made sufficiently thin so that those portions of the respective intake ports that are not registered with a portion of their respective runners are instead exposed directly to the interior of the plenum 69 so as to receive air therefrom for delivery to the engine cylinders.

In operation, the manifold 72 is movable longitudinally between two extreme positions. In the first position, the manifold legs directly register with their respective intake ports and air-fuel mixture from the carburetor is thereby supplied to all of the cellular passages of the respective intake ports for delivery to the engine cylinders. In the second position, the manifold runners are moved completely out of registry with their respective intake ports and their ends are blocked by the side wall of the cylinder head, closing off the flow of air-fuel mixture through the manifold and leaving the ports open directly to the plenum for the full flow of air into the engine cylinders. In intermediate positions of the manifold, air-fuel mixture is supplied through the selected port cellular passages which are in registry with the manifold runners while air is supplied to the remaining passages of the intake ports that are open directly to the plenum 69. In this manner, both the volume and direction of entry of the air-fuel mixture charge into the cylinder are controlled. Further, by suitable arrangement of the runners and the intake ports it may be possible to provide stratified charges within the cylinders. Other uses of the arrangement may also be contemplated.

While the invention has been described by reference to certain preferred embodiments chosen for purposes of illustration, it should be understood that numerous variations and modifications could be made without departing from the spirit and scope of the inventive concepts underlying the described embodiments. Accordingly, it is intended that the invention not be limited except by the language of the following claims.

The embodiments of the invention in which an exclusive property or privilege is claimed are defined as follows.

1. In an internal combustion engine having at least one cylinder with a closed end, an intake port through the cylinder closed end and extending from an entrance portion in an exterior wall of the engine to a valve seat adjacent an interior wall of the cylinder, cellular passage defining transversely intersecting walls extending longitudinally of the intake port from its entrance portion to adjacent said valve seat to direct inlet gas flow in a plurality of separate generally parallel cellular flow paths having transverse dimensions substantially less than those of the port and extending through predetermined portions along substantially the total length of the port, and adjustable valve means at the port entrance portion and movable to selectively open a desired number and grouping of said cellular flow paths whereby the amount and location of gas flow delivery to the cylinder is adjustably controlled.

2. The combination of claim 1 wherein said adjustable valve means is operative to selectively block off those of the cellular flow paths of its respective port which are not selectively opened in any particular position setting of the valve means.

3. In an internal combustion engine having at least one cylinder with a closed end, an intake port through the cylinder closed end and extending from an entrance portion in an exterior wall of the engine to a valve seat adjacent an interior wall of the cylinder, cellular passage defining walls extending longitudinally of the intake port from its entrance portion to adjacent said valve seat to direct inlet gas flow in a plurality of separate generally parallel cellular flow paths through predetermined portions of the port, a first source of fluid air-fuel mixture connectable with the intake port at said exterior wall a second source of supplemental inlet fluid connectable with the intake port at said exterior wall, and adjustable valve means at the port entrance portion and movable to selectively open to each of said first and second fluid sources a desired number and grouping of said cellular flow paths whereby the relative amount and location of gas flow delivery from said fluid sources to the cylinder is adjustably controlled.

4. The combination of claim 3 wherein said valve means comprises an intake conduit connected internally with said first fluid source and having a chamber surrounding said port connected with said second fluid source, said conduit having an outlet end slidable along said engine exterior wall into greater and lesser register with the intake port to vary the portion of the port connected with the first and second fluid sources.

* * * * *